MODULATED CARRIER WAVE TRANSMITTING INSTALLATIONS
INCLUDING STAND-BY APPARATUS
Filed Aug. 14, 1964
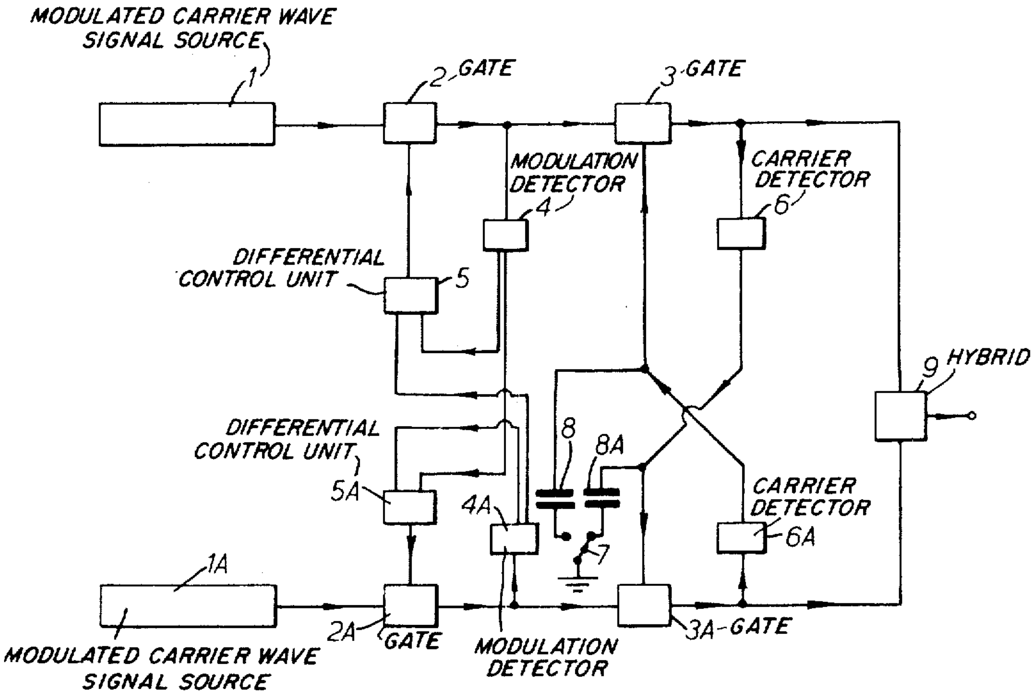
INVENTORS
Hubert Haywood
and
Boleslaw Marian Sosin
BY Baldwin & Wight
ATTORNEYS United States Patent Office 3,363,181

Patented Jan. 9, 1968

3,363,181

MODULATED CARRIER WAVE TRANSMITTING INSTALLATIONS INCLUDING STAND-BY APPARATUS

Hubert Haywood and Boleslaw Marian Sosin, Chelmsford, England, assignors to The Marconi Company Limited, London, England, a British company Filed Aug. 14, 1964, Ser. No. 389,551
Claims priority, application Great Britain, Oct. 8, 1963, 39,602/63
5 Claims. (Cl. 325—133)

ABSTRACT OF THE DISCLOSURE

This invention relates to broadcast and other modulated carrier wave transmitting installations and more particularly to installations wherein stand-by sections of the transmitting apparatus are automatically utilized upon the detection of improper operation of normally utilized portions of the apparatus.

A transmitting installation is disclosed herein which comprises two modulated carrier wave signal producing portions, a pair of first gates or gating means fed from the aforementioned portions, difference responsive means capable of detecting a difference in signal resultant from failure of one of the signal producing sections, a pair of second gates or gating means fed from each of the aforementioned first gates, carrier strength responsive apparatus responsive to the output of each of said second gates and capable of blocking one or the other of the further gates, and a common transmitting channel coupled to the ouptut of the second gates.

Further disclosed herein is apparatus of the type previously described suitable for use in amplitude modulated signal transmitting installations and apparatus suitable for use in frequency modulated signal transmitting installations. Further disclosed herein is apparatus of the aforementioned type wherein a manually operable switch is utilized to provide selection between the alternate signal transmitting sections to determine which of such sections is to be utilized as the stand-by section.

It is important, more particularly in the case of broadcast transmitting installations, to maintain continuity of service with a minimum of interruption due to failure of valves and/or other components and with this end in view it is common to duplicate sections of such an installation so that, in the event of failure of one section, a standby section can be brought into use while one which has failed can be repaired. The present invention seeks to provide improved relatively simple modulated carrier wave transmitting installations which shall be of high reliability of continuity of service and which shall be such that, in the event of failure in certain sections of the installation, standby sections shall be automatically brought into use to replace them in operation virtually without any interruption of service.

The sections of a modulated carrier wave transmitting installation which in practice, are most likely to fail, are the carrier frequency sections, the modulation frequency sections and the sections in which the carrier is modulated. This is in general true for frequency modulated and amplitude modulated installations and irrespective, of course, of the nature of the modulating signals. If, therefore, there is duplication of the equipment at the output of which the modulated carrier appears and there are provided means for effectively switching in the second of these equipments automatically in the event of failure of correct modulation content or correct carrier content (or both) in the equipment for the time being in use, a high degree of reliability of operation and continuity of service will be obtained. The present invention seeks to achieve this.

According to this invention a modulated carrier wave transmitting installation includes at least two means for producing modulated carrier wave signals which, in the absence of faults in either of said means, are substantially identical; a pair of first gates each fed from one or other of said means; means responsive to differences, resulting from failure in one of said producing means, between the modulation contents of the outputs from said first gates for blocking the gate fed from the means in which failure has occurred; two further gates, one fed from each of the first gates; means responsive to the presence of predetermined carrier strength at the output of each further gate for blocking the other of said further gates; and a common transmitting channel coupled to the output sides of the two further gates.

If the means for producing modulated carrier wave signals are adapted to produce amplitude modulated signals, the means responsive to occurring differences between modulation contents may comprise a pair of modulation detectors each fed with output from a different one of the first gates and each adapted to produce a direct current potential representative of the modulation content of the signals fed thereto; means for applying D.C. potentials from both detectors to a differential control unit controlling one of the first gates; and means for applying D.C. potentials from both detectors to a second control unit controlling the other of the first gates; the whole arrangement being such that normally both first gates are conductive but if the D.C. potential from one detector falls a pre-determined amount below that from the other, the control unit controlling the first gate from whose output said detector is fed operates to block said first gate.

If the means for producing modulated carrier wave signals are adapted to produce frequency modulated signals, the means responsive to occurring differences between modulation contents may comprise a pair of frequency discriminators each fed with output from a different one of the first gates and each adapted to produce a direct current potential representative of the modulation content of the signals fed thereto; means for applying D.C. potentials from both discriminators to a differential control unit controlling one of the first gates; and means for applying D.C. potentials from both discriminators to a second control unit controlling the other of the first gates; the whole arrangement being such that normally both first gates are conductive but if the D.C. potential from one discriminator falls a pre-determined amount below that from the other, the control unit controlling the first gate from whose output said discriminator is fed operates to block said first gate.

Preferably manually operable switch selecting means are provided for selecting which one of the further gates is conductive so long as the outputs from the means for producing modulated carrier wave signals are substantially identical. Such selecting means may comprise a pair of condensers each connected on one side to the control input circuit of one or other of the control units and a two-position switch adapted to connect (in dependence on its position) the other side of one or other of said condensers to earth.

The invention is illustrated in the accompanying drawing. The single figure of the drawing is a simplified block circuit diagram and serves to illustrate two embodiments, one being for an amplitude modulated installation and the other for a frequency modulated installation.

Referring to the drawing 1 and 1A represent two equipments which are as known per se and as nearly as possible identical. Each is adapted to produce at its output a modulated carrier wave signal having substantially the same carrier and modulation contents as the other so long as there is no fault in either equipment. The equipments could be adapted to produce an amplitude modulated carrier output or a frequency modulated carrier output.

The outputs from the equipments 1 and 1A are fed to two first gates 2 and 2A followed by two further gates 3 and 3A as shown. These gates could, of course, be incorporated in amplifiers.

The outputs from gates 2 and 2A are also fed to similar modulation detectors 4 and 4A respectively which may be of any form known per se adapted to produce D.C. outputs representative of the modulation input thereto. In the case of amplitude modulation the detectors 4 and 4A would be constituted by amplitude modulation detectors. In the case of frequency modulation the detectors 4 and 4A would be constituted by frequency discriminators. Each detector has two output leads with the same output on both leads, the two output leads from each detector 4 or 4A being mutually isolated as respects D.C.

Control output from the detector 4 provides one input to two differential control units 5 and 5A and control output from the unit 4A provides the second input to these two units 5 and 5A which control the gates 2 and 2A respectively. The arrangement is made such that so long as the modulation contents of the signals fed to the units 4 and 4A are the same, both gates 2 and 2A will be conductive but in the event of any failure in equipment 1 or 1A causing the modulation content to units 4 and 4A to cease to be alike, the control unit 5 or 5A controlling the gate 2 or 2A fed from the equipment 1 or 1A in which the failure has occurred will operate to block the gate in question. In satisfying the above conditions, it will, of course, be readily apparent to one of ordinary skill in the art to avoid connecting the inputs to the two differential control units 5 and 5A such that the outputs therefrom simultaneously trigger the gates 2 and 2A to either a blocking or passing condition in response to a failure in either of the two sources 1 and 1A. It is not thought necessary to describe the detailed circuitry employed to produce this result since such circuitry may take any of a variety of forms well known per se. The two differential control units 5 and 5A may be any of a number of well known difference circuit configurations.

Outputs from the second gates 3 and 3A are fed to carrier detectors 6 and 6A of known form and each adapted to provide a D.C. control output representative of the carrier input thereto. The output from detector 6 blocks gate 3A if the input to said detector is of correct pre-determined value while the output from detector 6A blocks gate 3 if the input to said detector 6A is of correct pre-determined value. It will be seen that, with the arrangement as so far described, the first detector 6 or 6A to build up to full output (assuming there is no fault) will block the further gate 3A or 3 leaving the other gate conductive. It is preferred however to provide means for selecting which gate 3 or 3A is conductive in the absence of any fault. In the illustrated arrangement for this purpose the leads from the detectors 6 and 6A to the gates 3A and 3 respectively are connected through condensers 8A and 8 to the selectable contacts of a switch 7 the arm of which is earthed. It will be apparent that, by moving the arm of the switch 7 to one or other of its two positions choice may be made of the gate 3 or 3A which is conductive in the absence of any fault.

The output sides of the gates 3 and 3A are connected to a suitable common output circuit e.g. as shown they may be connected to the input terminals of a hydrid 9, the output from which is fed to the remainder (not shown) of the transmitting installation.

It will be seen that so long as there is identity of modulation content at the inputs to the detectors 4 and 4A, both gates 2 and 2A will be conductive and, so long as the carrier content from both equipments 1 and 1A is also correct one or other of the gates 3 and 3A will be conductive depending on the setting of the switch 7. If, however, failure in one of the equipments 1 or 1A produces inequality of modulation content at the inputs to the detectors 4 and 4A, the first gate 2 or 2A fed from that equipment will be blocked. This cuts off the input to the further gate 3 or 3A fed from the first gate in question and this causes the other further gate to be rendered conductive irrespective of the setting of the switch 7. If the modulation contents at the inputs of the detectors 4 and 4A remain equal but failure in one of the equipments 1 or 1A causes incorrect carrier output from that equipment, the output from the further gate 3 or 3A in the channel fed from the equipment in question will drop causing the detector 6 or 6A fed thereby to render the other gate 3A or 3 conductive, again irrespective of the position of switch 7.

We claim:

1. A modulated carrier wave transmitting installation including at least two means for producing modulated carrier wave signals which, in the absence of faults in either of said means, are substantially identical; a pair of first gates each fed from one or other of said means; means responsive to differences, resulting from failure in one of said producing means, between the modulation contents of the outputs from said first gates for blocking the gate fed from the means in which failure has occurred; two further gates, each fed from a respective one of the first gates; means responsive to the presence of pre-determined carrier strength at the output of each further gate for blocking the other of said further gates; and a common transmitting channel coupled to the output sides of the two further gates.

2. An installation as claimed in claim 1 wherein the means for producing modulated carrier wave signals are adapted to produce amplitude modulated signals, and the means responsive to occurring differences between modulation contents comprise a pair of modulation detectors each fed with output from a different one of the first gates and each adapted to produce a direct current potential representative of the modulation content of the signals fed thereto; means for applying D.C. potentials from both detectors to a differential control unit controlling one of the first gates; and means for applying D.C. potentials from both detectors to a second control unit controlling the other of the first gates; the whole arrangement being such that normally both first gates are conductive but if the D.C. potential from one detector falls a pre-determined amount below that from the other, the control unit controlling the first gate from whose output said detector is fed operates to block said first gate.

3. An installation as claimed in claim 1 wherein the means for producing modulated carrier wave signals are adapted to produce frequency modulated signals and the means responsive to occurring differences between modulation contents comprise a pair of frequency discriminators each fed with output from a different one of the first gates and each adapted to produce a direct current potential representative of the modulation content of the signals fed thereto; means for applying D.C. potentials from both discriminators to a differential control unit controlling one of the first gates; and means for applying D.C. potentials from both discriminators to a differential control unit controlling one of the first gates; and means for applying D.C. potentials from both discriminators to a second control unit controlling the other of the first gates; the whole arrangement being such that normally both first gates are conductive but if the D.C. potential from one discriminator falls a pre-determined amount below that from the other, the control unit controlling the first gate from whose output said discriminator is fed operates to block said first gate.

4. An installation as claimed in claims 1 wherein manually operable switch selecting means are provided for selecting which one of the further gates is conductive so long as the outputs from the means for producing modulated carrier wave signals are substantially identical.

5. An installation as claimed in claim 4 wherein such selection means comprise a pair of condensers each connected on one side to the control imput circuit of one or other of the control units and a two-position switch adapted to connect (in dependence on its position) the other side of one or other of said condensers to earth.

References Cited

UNITED STATES PATENTS

| | | | |
|---|---|---|---|
| 2,840,696 | 6/1958 | Beck et al. ------ | 325—156 X |
| 2,892,930 | 6/1959 | Magnuski et al. ---- | 325—5 X |
| 3,035,169 | 5/1962 | Griffith --------- | 325—158 X |
| 3,045,185 | 7/1962 | Mathwich ---------- | 333—3 X |
| 3,204,204 | 8/1965 | Buxton et al. ------ | 333—3 X |

JOHN W. CALDWELL, *Primary Examiner.*